United States Patent
Araujo et al.

(10) Patent No.: US 7,068,869 B1
(45) Date of Patent: Jun. 27, 2006

(54) PASSIVE ATHERMAL FIBER BRAGG GRATING STRAIN GAGE

(76) Inventors: Francisco Manuel Moita Araujo, Rua Calouste Gulbenkian, 169, P6H4, 4050-145 Porto (PT); Luis Alberto de Almeida Ferreira, Rua Machado dos Santos, 617, 4 esq., 4400-209 Vila Nova de Gaia (PT)

( * ) Notice: Subject to any disclaimer, the term of this patent is extended or adjusted under 35 U.S.C. 154(b) by 0 days.

(21) Appl. No.: 10/905,544

(22) Filed: Jan. 10, 2005

(51) Int. Cl.
*G02B 6/00* (2006.01)

(52) U.S. Cl. .......................... 385/13; 385/37; 385/137

(58) Field of Classification Search ............ 385/10–13, 385/15, 27, 37, 39, 134, 137
See application file for complete search history.

(56) References Cited

U.S. PATENT DOCUMENTS

2004/0234200 A1* 11/2004 Jennings et al. .............. 385/37

* cited by examiner

Primary Examiner—Phan Palmer
(74) Attorney, Agent, or Firm—John F. Bohland

(57) ABSTRACT

Fiber Bragg gratings (FBGs) are particular suitable for measuring strain. However, a single parameter measurement is difficult to implement, since cross-sensitivity to temperature compels the use of an additional temperature reference, e.g. a strain-inactive FBG. The development of a passive athermal fiber Bragg grating strain gage is thus of particular interest since it renders optional the measurement of temperature, benefiting large scale system design and performance. In view of this need, a package for fiber Bragg gratings that enables strain measurements to be performed while canceling temperature sensitivity is disclosed. The proposed design is based on a structure composed of two parts, which can be made of the same material, having a defined length ratio that allows the adjustment of the temperature sensitivity to zero, providing athermal operation of the strain gage. Moreover, the disclosed passive athermal scheme is adjustable to further compensate for structural thermal expansion, enabling the load-induced strain component to be decoupled from the temperature-induced strain component.

18 Claims, 2 Drawing Sheets

PASSIVE ATHERMAL FIBER BRAGG GRATING STRAIN GAGE

FIELD OF THE INVENTION

The present invention relates to optical fiber sensors and, more particularly, pertains to fiber Bragg grating strain gages with adjustable compensation for thermal effects.

BACKGROUND

A fiber Bragg grating (FBG) is a periodic modulation of the refractive index of the core of a single mode optical fiber usually written by exposure to UV light. This periodic structure is characterized by a narrow reflective spectral response. The center wavelength $\lambda_B$ of the reflection band matches the Bragg condition:

$$\lambda_B = 2n_{eff}\Lambda, \tag{1}$$

where $n_{eff}$ is the effective index of the guided mode and $\Lambda$ is the period of the index modulation. The FBG resonance wavelength will vary accordingly with temperature and/or strain changes experienced by the fiber. For a temperature change $\Delta T$; the corresponding wavelength shift is given by:

$$\Delta\lambda_B = \lambda_B\left(\frac{1}{\Lambda}\frac{\partial\Lambda}{\partial T} + \frac{1}{n}\frac{\partial n}{\partial T}\right)\Delta T = \lambda_B(\alpha_F + \xi)\Delta T = \lambda_B\beta_T\Delta T, \tag{2}$$

where $\alpha_F$ is the fiber coefficient of thermal expansion (CTE) and $\xi$ is the fiber thermo-optic coefficient, with values of 0.55 ppm/° C. and 6.7 ppm/° C., respectively. The wavelength shift induced by a longitudinal strain variation $\epsilon$ is given by $$\Delta\lambda_B = \lambda_B\left(\frac{1}{\Lambda}\frac{\partial\Lambda}{\partial\varepsilon} + \frac{1}{n}\frac{\partial n}{\partial\varepsilon}\right)\varepsilon = \lambda_B(1-p_e)\varepsilon = \lambda_B\beta_\varepsilon\varepsilon, \tag{3}$$

where $p_e$ is the photoelastic coefficient of the fiber (typically, $p_e=0.22$). In the last two equations, $\beta_T$ and $\beta_\epsilon$, are defined as the temperature and strain sensitivities of the FBG, respectively. The usual approximate values for these two coefficients on the C-band are $\beta_T=7.25$ ppm/° C. and $\beta_\epsilon=0.76$ ppm/$\lambda\epsilon$. The overall Bragg wavelength shift induced by temperature change and/or strain is then given by $$\frac{\Delta\lambda_B}{\lambda_B} = \beta_T\Delta T + \beta_\varepsilon\varepsilon. \tag{4}$$

The simplest method to overcome cross-sensitivity to temperature while measuring strain with FBGs relies on the use of an additional temperature reference, such as a strain-inactive FBG [W. W. Morey, G. Meltz and J. M. Weiss, "Evaluation of a fiber Bragg grating hydrostatic pressure sensor," in *Proceedings of the Eighth International Conference on Optical Fiber Sensors* (Monterey, Calif., USA), Postdeadline Paper PD-4.4 (1992)]. Other methods, based on the use of dual wavelength FBG [M. G. Xu, J.-L. Archambault, L. Reekie, and J. P. Dakin, "Discrimination between strain and temperature effects using dual-wavelength fiber grating sensors," *Electron. Lett.* 30, pp. 1085–1087 (1994)], FBG and fiber polarization-rocking filter [S. E. Kanellopoulos, V. A. Handerek, and A. J. Rogers, "Simultaneous strain and temperature sensing with photo-generated in-fiber gratings," *Opt. Lett.* 20, pp. 333–335 (1995)], non-sinusoidal FBG [G. P. Brady, K. Kalli, D. J. Webb, D. A. Jackson, L. Zhang, and I. Bennion, "Recent developments in optical fiber sensing using fiber Bragg gratings," in *Proceedings of the Fiber Optic and Laser Sensors XIV* (Denver, Colo., USA), SPIE 2839, pp. 8–19 (1994)], FBG written in different diameter fiber [S. W. James, M. L. Dockney, and R. P. Tatam, "Simultaneous independent temperature and strain measurement using in-fiber Bragg grating sensors," *Electron. Lett.* 32, pp. 1133–1134 (1996)], FBG and long period grating [H. Patrick, G. M. Williams, A. D. Kersey, J. R. Pedrazzani, and A. M. Vengsarkar, "Hybrid fiber Bragg grating/long period fiber grating sensor for strain/temperature discrimination," *Photon. Technol. Lett.* 8, pp. 1223–1225 (1996)], FBG and in-line fiber etalon [H. Singh and J. Sirkis, "Simultaneous measurement of strain and temperature using optical fiber sensors: two novel configuration" in *Proceedings of the Eleventh International Conference on Optical Fiber Sensors* (Hokkaido University, Sapporo, Japan), pp. 108–111 (1996)], and FBG pair written in hi-bi fibers [M. Sudo, M. Nakai, K. Himeno, S. Suzaki, A. Wada, and R. Yamauchi, "Simultaneous measurement of temperature and strain using PANDA fiber grating," in *Proceedings of the Twelfth International Conference on Optical Fiber Sensors* (Williamsburg, Va., USA), pp. 170–173 (1997), L. A. Ferreira, F. M. Araújo, J. L. Santos, F. Farahi, "Simultaneous measurement of strain and temperature using interferometrically interrogated fibre Bragg grating sensors", Optical Engineering 39, pp. 2226–2234 (2000)] have been demonstrated, but they are often too complex and difficult to implement in real world structures. Moreover, besides being not required in all the strain monitoring cases, the measurement of temperature by the referred methods implies the allocation of additional bandwidth to each sensor, therefore limiting the total number of sensors in a given sensing network.

One temperature compensation method relies on subjecting the FBG to additional temperature induced strain. The simplest method of applying temperature dependent strain to an FBG is to attach it to a material with a CTE dissimilar to silica. However, this restricts the adjustment of the FBG sensitivity to the set of discrete values that can be obtained employing available materials. A well-known method of attaining a broad range of effective CTEs, including negative CTE values, is to provide a structure incorporating a proper arrangement of two materials with distinct CTEs [DE3112193, incorporated herein by reference]. A proper design of such a structure can be used for packaging FBGs, allowing for continuous adjustment of the FBG temperature sensitivity. The particular case of a thermal operation employing this concept has been the focus of several patent applications [WO 01/67142 A2, U.S. Pat. No. 6,393,181 B1; both incorporated herein by reference]. These methods require the use of two materials having different CTEs.

OBJECTS AND SUMMARY OF THE INVENTION

It is an object of the present invention to provide a package for fiber Bragg gratings that enables strain measurements to be performed while canceling temperature sensitivity, thus extending the range of applications of such components.

It is also an object of the present invention to provide an FBG strain gage comprising two structural elements, which can be made of the same material, having a defined length ratio that allows adjustment of the temperature sensitivity to zero, providing athermal operation of the strain gage.

It is a further object of the present invention to provide an athermal FBG strain gage especially suitable for structural health monitoring applications.

It is also an object of the present invention to provide a method for measuring strain that does not require an independent measurement of temperature.

A strain gage according to the present invention can also be adjusted to compensate for structural thermal expansion, enabling load-induced strain-components to be isolated.

The present method for enabling strain measurements while canceling temperature sensitivity (TS) relies on subjecting the FBG to additional temperature induced strain, $\epsilon(T)$, according to the following expression $$TS = \frac{\Delta\lambda_B/\lambda_B}{\Delta T} = \beta_T + \frac{\beta_\epsilon \epsilon(T)}{\Delta T}. \tag{5}$$

This method enables not only annulled temperature sensitivity, i.e., TS=0, but also enhanced positive temperature sensitivity, i.e., TS>$\beta_T$, reduced positive temperature sensitivity, i.e., TS<$\beta_T$, or even negative temperature sensitivity, i.e., TS<0. In the particular case of annulled temperature sensitivity, the exact balancing between the intrinsic FBG temperature sensitivity and temperature induced strain, $\beta_T=-\beta_\epsilon(\ )/\Delta T$, provides so-called athermal operation of the strain gage.

DESCRIPTION OF A PREFERRED EMBODIMENT OF THE INVENTION

Figure 1:
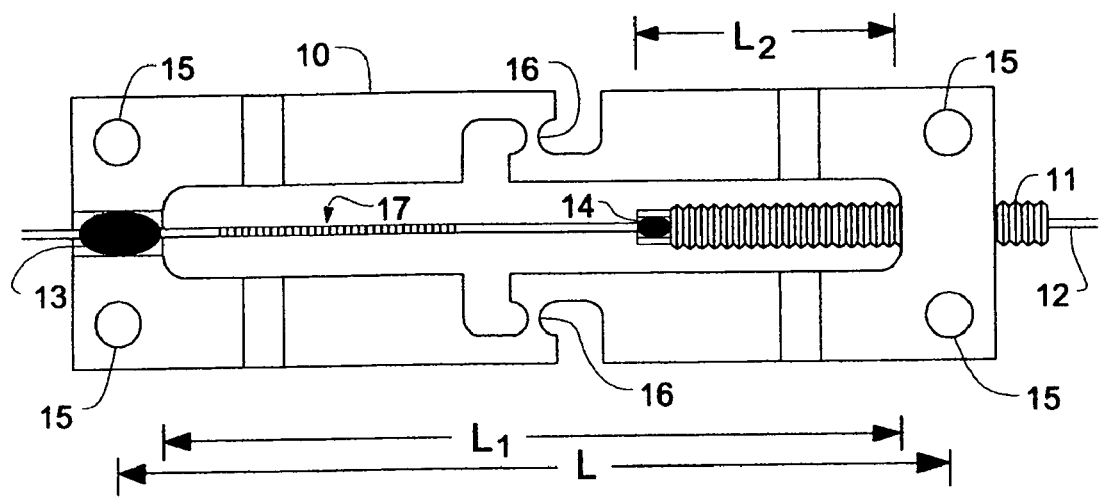
FIG. 1 is a plan view of a preferred embodiment of an athermal FBG strain gage according to the present invention.
Figure 2:
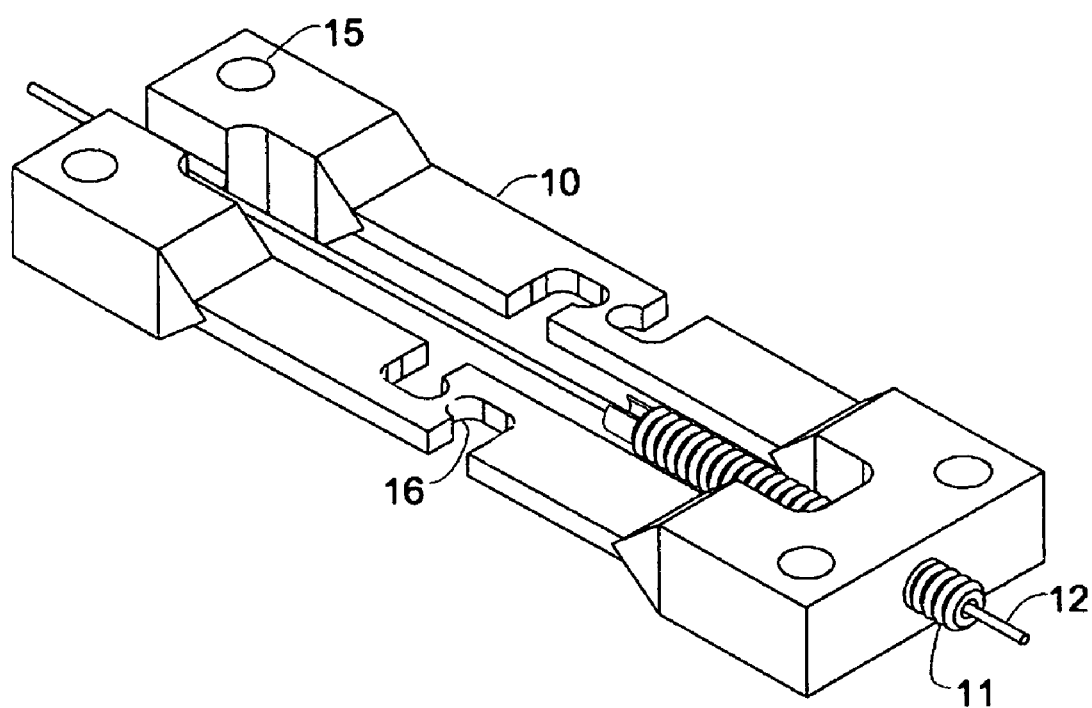
FIG. 2 is an isometric view of a preferred embodiment of an athermal FBG strain gage according to the present invention.

FIGS. 1 and 2 are plan and isometric views of a preferred embodiment of an athermal FBG strain gage according to the present invention. Other embodiments and variations are within the scope of the invention as claimed.

An athermal FBG strain gage according to the present invention has a frame 10, a pointer 11, an optical fiber 12, fiber-to-frame engagement means 13, and fiber-to-pointer engagement means 14. The fiber-to-frame engagement means 13 and fiber-to-pointer engagement means 14 are adhesives, such as epoxies; alternatively, other means known in the art for fixing optical fibers to supporting structures may be used. Means for fixing the frame to a structural element to be monitored are also provided. In the preferred embodiment, fixing holes 15 which accommodate fasteners such as rivets, bolts, or screws are the means used to attach the strain gage frame to the structure being monitored. Alternatively, other fastening means such as welding may be employed. The frame has flexure points 16 that allow strain to be applied to the FBG with minimum force on the frame.

The pointer 11 in this embodiment is threaded and engaged with a threaded aperture in the frame so that the length $L_2$ extending into the frame is adjustable. Means for adjustable engagement other than threads may be used as alternatives. The length $L_1$ is the distance between the point at which the fiber is fixed to the frame and the point at which the pointer is fixed to the frame. The length of the fiber segment between the fiber attachment points within the gage frame is then $L_1-L_2$. The FBG 17 is contained within this fiber segment.

The pointer is fabricated from a material having a known CTE, $\alpha$. The frame may be made of the same or any other compatible material. These two parts are assembled to form a suitable structure to measure strain through a standard FBG. In the preferred embodiment of the invention the parts have cylindrical geometry, allowing the optical fiber insertion on the geometrical axis of the structure. This arrangement may provide off-axis alignment means to avoid fiber buckling under compressive strain. In the absence of such guiding parts, pre-strain must be applied to the FBG to account for strain release during operation. This concentric arrangement also maintains the intrinsic cross-section symmetry of the optical fiber, thus minimizing the performance degradation due to misalignment during assembly. It also provides suitable mechanical protection for the packaged FBG, when no recoating of the pristine optical fiber is performed.

Athermal Performance

An FBG strain gage according to the present invention provides passive athermal performance. Considering that the frame part will be completely solidary with the material of the structure to be monitored, concrete, for example, then its "effective CTE" becomes zero, since the frame will not deform under a temperature change, unless the structure itself expands or contracts. In this case, and with $\alpha$ being the CTE of the pointer part, the following expression can be written for the FBG wavelength shift induced by temperature:

$$\frac{\Delta\lambda_B}{\lambda_B} = \left[\beta_T + \beta_\epsilon\left(-\frac{\alpha L_2}{L_1-L_2}\right)\right]\Delta T. \tag{6}$$

In this expression, $L_1$ and $L_2$ are the lengths of the frame and the pointer parts and $\beta_T$ and $\beta_\epsilon$ are defined as the temperature and strain sensitivities of the FBG, respectively. The usual approximate values for these two coefficients on the C-band are $\beta_T$=7.25 ppm/° C. and $\beta_\epsilon$=0.76 ppm/µ$\epsilon$. Minimum wavelength drift with temperature can be obtained by balancing these two lengths, thus resulting in the following condition for the balancing ratio (BR)

$$BR = \frac{L_2}{L_1} = \frac{1}{1+\alpha\frac{\beta_\epsilon}{\beta_T}}. \tag{7}$$

From this ratio, it is straightforward to state that minimum length design is obtained for maximum $\alpha$. It should also be emphasized that this design restricts the maximum FBG length to $L_1-L_2$; thus for a given FBG length, it is always possible to calculate the lengths $L_1$ and $L_2$ that fulfill both conditions. Taking into account these constraints, aluminum, with $\alpha=23.5$ ppm/° C., is a preferred material for building the strain gage. Considering this CTE value and the previous values given for $\beta_T$ and $\beta_\epsilon$, equation 7 yields a ratio of 0.289, which for a frame internal width $L_1=40$ mm results in a pointer length of $L_2=11.5$ mm. Although aluminum presents several beneficial properties for packaging, e.g., high Young modulus, high CTE ratio, out of the shelf promptness, broad range of dimensional availability, and easy material processing, other materials can be employed (e.g., zinc).

Strain Gage Performance

The strain gage performance of the present invention is now analyzed. The frame of the strain gage has flexures that allow strain at minimum stress to be readily applied to the FBG. Therefore, for a displacement $\Delta L$ applied to the fixing holes on the frame, the FBG will be subjected to a strain given by $$\varepsilon_{FBG} = \varepsilon_{structure} \cdot \frac{L}{L_1 - L_2} = \frac{\Delta L}{L_1 - L_2}. \quad (8)$$

The Bragg wavelength shift associated with displacement $\Delta L$ is, therefore, given by $$\frac{\Delta \lambda_B}{\lambda_B} = \beta_\varepsilon \frac{\Delta L}{L_1 - L_2}. \quad (9)$$

The mentioned strain may arise from load applied to the structure and/or temperature induced deformation. In any case, the strain gage will measure the total strain without need for temperature referencing.

Compensation for Structural Thermal Expansion

If one wants to measure only strain that arises from load applied to the structure in a decoupled way from structure temperature induced effects, then one must also consider the temperature induced strain in expression (6)

$$\frac{\Delta \lambda_B}{\lambda_B} = \left[ \beta_T + \beta_\varepsilon \left( \frac{\alpha_s L_1 - \alpha L_2}{L_1 - L_2} \right) \right] \Delta T, \quad (10)$$

$\alpha_s$ being the structure thermal expansion coefficient. In this case, minimum wavelength drift with temperature can be obtained for the following "load" balancing ratio ($BR_L$):

$$BR_L = \frac{L_2}{L_1} = BR + \frac{\beta_\varepsilon \alpha_s}{\beta_T + \beta_\varepsilon \alpha}. \quad (11)$$

The Bragg wavelength shift associated with load induced displacement is still given by expression (9), but now $\Delta L$ represents only the part of the displacement arising from load applied to the structure, and not induced by any temperature fluctuations that may occur.

What is claimed is:

1. A fiber Bragg grating strain gage for measuring strain in a structural element comprising:
a frame having a first end and a second end wherein said first end of said frame includes means for adjustably engaging a pointer and said second end of said frame includes means for engaging an optical fiber and wherein the distance between said means for adjustably engaging a pointer and said means for engaging an optical fiber has a predetermined value $L_1$, a pointer having a first end and a second end wherein said first end of said pointer is adjustably engaged with said first end of said frame and said second end of said pointer includes means for engaging an optical fiber and wherein the distance between said second end of said pointer and said first end of said frame is set to a value of $L_2$, and wherein the coefficient of thermal expansion of said pointer is $\alpha$, an optical fiber containing a fiber Bragg grating having a first attachment point and a second attachment point wherein said first attachment point is engaged with said second end of said pointer and said second attachment point is engaged at said second end of said frame, and wherein $\beta_T$ is the temperature sensitivity of said fiber Bragg grating and $\beta_\epsilon$ is the strain sensitivity of said fiber Bragg grating, means for fixing said frame to a structural element.

2. The fiber Bragg grating strain gage of claim 1 wherein the material of construction of said frame is substantially the same as the material of construction of said pointer.

3. The fiber Bragg grating strain gage of claim 2 wherein said frame comprises flexure points, thereby reducing the force required to produce a given strain.

4. The fiber Bragg grating strain gage of claim 3 wherein said means for engaging a pointer is a threaded aperture.

5. The fiber Bragg grating strain gage of claim 4 wherein said means for fixing said frame to a structural element are fixing holes in combination with fasteners.

6. The fiber Bragg grating strain gage of claim 4 wherein said means for fixing said frame to a structural element are welds.

7. The fiber Bragg grating strain gage of claim 1 wherein $\alpha > 20$ ppm/° C.

8. The fiber Bragg grating strain gage of claim 7 wherein the material of said pointer is substantially aluminum.

9. The fiber Bragg grating strain gage of claim 1 wherein said frame has a coefficient of thermal expansion greater than 20 ppm/° C.

10. The fiber Bragg grating strain gage of claim 9 wherein the material of said frame is substantially aluminum.

11. The fiber Bragg grating strain gage of claim 1 wherein the coefficient of thermal expansion of said frame is greater than $\alpha$.

12. The fiber Bragg grating strain gage of claim 1 wherein said frame comprises flexure points, thereby reducing the force required to produce a given strain.

13. The fiber Bragg grating strain gage of claim 1 wherein said means for adjustably engaging a pointer is a threaded aperture.

14. The fiber Bragg grating strain gage of claim 1 wherein said means for fixing said frame to a structural element are fixing holes in combination with fasteners.

15. The fiber Bragg grating strain gage of claim 1 wherein said means for fixing said frame to a structural element are welds.

16. A method for monitoring the structural health of a structure comprising:

providing a structure having at least one structural element, wherein the coefficient of thermal expansion of the structural element is $\alpha_s$, attaching the fiber Bragg grating strain gage of claim 1 to said structural element, monitoring the Bragg wavelength of said fiber Bragg grating, calculating the strain in said structural element.

17. The method of claim 16 further comprising the step of adjusting the position of said pointer in said frame to substantially satisfy the following relationship:

$$\frac{L_2}{L_1} = \frac{1}{1 + \alpha \frac{\beta_\varepsilon}{\beta_T}}.$$

18. The method of claim 16 further comprising the step of adjusting the position of said pointer in said frame to substantially satisfy the following relationship:

$$\frac{L_2}{L_1} = \frac{1}{1 + \alpha \frac{\beta_\varepsilon}{\beta_T}} + \frac{\beta_\varepsilon \alpha_s}{\beta_T + \beta_\varepsilon \alpha}.$$

* * * * *